United States Patent
Paithankar et al.

(10) Patent No.: US 10,599,463 B2
(45) Date of Patent: Mar. 24, 2020

(54) SYSTEM AND METHOD FOR CREATING VIRTUAL MACHINES FROM CONTAINERS

(71) Applicant: Nutanix, Inc., San Jose, CA (US)

(72) Inventors: Abhijit Paithankar, San Jose, CA (US); Shruthi Racha, San Jose, CA (US)

(73) Assignee: NUTANIX, INC., San Jose, CA (US)

(*) Notice: Subject to any disclaimer, the term of this patent is extended or adjusted under 35 U.S.C. 154(b) by 87 days.

(21) Appl. No.: 15/938,159

(22) Filed: Mar. 28, 2018

(65) Prior Publication Data
US 2019/0303185 A1  Oct. 3, 2019

(51) Int. Cl.
*G06F 9/455* (2018.01)
*G06F 8/65* (2018.01)

(52) U.S. Cl.
CPC ............ *G06F 9/45558* (2013.01); *G06F 8/65* (2013.01); *G06F 2009/45562* (2013.01); *G06F 2009/45575* (2013.01); *G06F 2009/45583* (2013.01)

(58) Field of Classification Search
CPC combination set(s) only.
See application file for complete search history.

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,850,130 B1 | 9/2014 | Aron et al. | |
| 8,904,081 B1* | 12/2014 | Kulkarni | G06F 3/065 711/6 |
| 8,943,203 B1* | 1/2015 | Lent | G06F 9/4868 709/226 |
| 9,772,866 B1 | 9/2017 | Aron et al. | |
| 2005/0278332 A1* | 12/2005 | Petev | G06F 16/10 |
| 2012/0173871 A1* | 7/2012 | Ashok | G06F 21/575 713/153 |
| 2014/0026133 A1* | 1/2014 | Parker | G06F 9/5083 718/1 |
| 2017/0177860 A1* | 6/2017 | Suarez | G06F 21/31 |
| 2018/0088973 A1* | 3/2018 | Subhraveti | G06F 9/445 |
| 2018/0189089 A1* | 7/2018 | Chen | G06F 9/45558 |
| 2018/0196654 A1* | 7/2018 | Bo | G06F 9/455 |
| 2018/0225155 A1* | 8/2018 | Watt, Jr. | G06F 9/5083 |

(Continued)

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

(Continued)

*Primary Examiner* — Dong U Kim
(74) *Attorney, Agent, or Firm* — Foley & Lardner LLP

(57) ABSTRACT

A system and method include receiving, by a computing system, an initial container file of a container as input, such that the container is to be converted into a virtual machine and the initial container file is part of a plurality of container files associated with the container. The system and method also include parsing, by the computing system, the plurality of container files including the initial container file, generating, by the computing system, an ISO image from each of the parsed container files, and booting, by the computing system, the virtual machine using the ISO image from each of the parsed container files.

23 Claims, 5 Drawing Sheets

(56) References Cited

U.S. PATENT DOCUMENTS

2019/0149617 A1* 5/2019 Gao ............. H04L 67/148
                                                709/223
2019/0243681 A1* 8/2019 Chen ............. G06F 9/4843

OTHER PUBLICATIONS

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 3, 2017), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

Poitras, Steven. "The Nutanix Bible" (Jun. 8, 2017), from https://nutanixbible.com/.

Oitras, Steven. "The Nutanix Bible" (Jan. 3, 2018), from https://nutanixbible.com/.

Cano, Ignacio, et al. "Curator: Self-Managing Storage for Enterprise Clusters" (Mar. 27, 2017), from https://www.usenix.org/conference/nsdi17/.

* cited by examiner

SYSTEM AND METHOD FOR CREATING VIRTUAL MACHINES FROM CONTAINERS

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines concurrently. The one or more virtual machines utilize the hardware resources of the underlying one or more host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, present day virtual computing systems still have limitations due to their configuration and the way they operate.

A virtual machine may refer to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer. A "container" may refer to an isolated user space instance of collections of processes (e.g., programs, applications, services, etc.).

SUMMARY

Aspects of the present disclosure relate generally to creating virtual machines from a container using the inherent hierarchy of the containers. Containers are suitable for development and test environments as they are light weight and can be started and stopped in a few milliseconds. But since they share the underlying host's memory management, CPU scheduling, file system and kernel, they are not generally suitable for production environments due to compromised security and isolation. The disclosure describes systems that convert a Docker container into a virtual machine by taking a Docker file as input.

In accordance with at least some aspects of the present disclosure, a method is disclosed. The method includes receiving, by a computing system, an initial container file of a container as input. The container is to be converted into a virtual machine and the initial container file is part of a plurality of container files associated with the container. The method also includes parsing, by the computing system, the plurality of container files including the initial container file, generating, by the computing system, an ISO image from each of the parsed container files, and booting, by the computing system, the virtual machine using the ISO image from each of the parsed container files.

In accordance with some other aspects of the present disclosure, a system is disclosed. The system includes a database of a computing system configured to store a plurality of container files and a processor operatively coupled to the database. The processor is configured to receive an initial container file of a container as input. The container is to be converted into a virtual machine and the initial container file is part of the plurality of container files associated with the container. The processor is also configured to parse the plurality of container files including the initial container file, generate an ISO image from each of the parsed container files, and boot the virtual machine using the ISO image from each of the parsed container files.

In accordance with some other aspects of the present disclosure, non-transitory computer readable media with computer-executable instructions embodied thereon is disclosed. The instructions when executed by a processor of a computing system, cause the computing system to perform a process including receiving an initial container file of a container as input. The container is to be converted into a virtual machine and the initial container file is part of a plurality of container files associated with the container. The process also includes parsing the plurality of container files including the initial container file, generating an ISO image from each of the parsed container files, and booting the virtual machine using the ISO image from each of the parsed container files.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
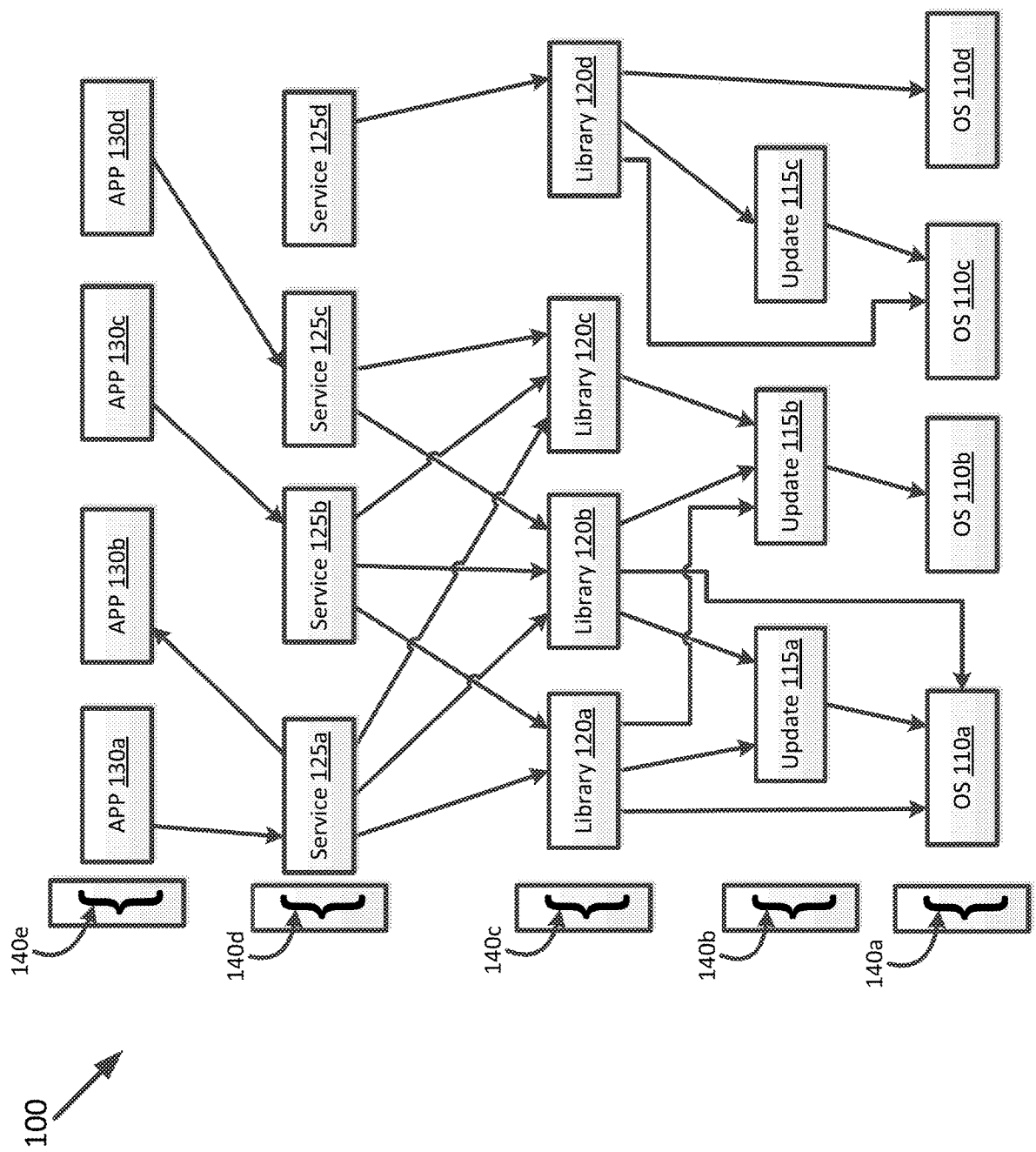
FIG. 1 is a block diagram illustrating a multi-rooted hierarchy of possible software stack elements, according to one or more implementations.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is generally directed to creating virtual machines from a container using the hierarchy of containers. By their nature of size and structure, containers are light weight and can be started and stopped quickly. These features make containers ideal, for instance, in development and testing. Containers also share an underlying host's memory management, CPU scheduling, file system, and kernel. As such, containers are not preferred for production due to technical problems such as potential security and isolation concerns. One technical solution to these concerns would be to convert a container into a virtual machine using a container file as input.

Turning now to FIG. 1, an example of a multi-rooted hierarchy 100 of possible software stack elements is illustrated, according to one or more implementations. As shown, a multi-rooted hierarchy 100 of possible software stack elements may include possible roots via operating systems (OSes) 110a-110d. For example, an OS of OSes 110a-110d may be selected for a software stack level 140a. For instance, an OS of OSes 110a-110d may include a Microsoft Windows OS, a Linux OS, a BSD OS, an Android OS, or a real time OS, among others. As illustrated, the multi-rooted hierarchy 100 may include possible updates 115a-115c that may be applied to possible OSes 110a-110c, corresponding to respective arrows. For example, one or more possible updates of updates 115a-115c may be selected from a software stack level 140b. Although the OS 115d is not shown as being updated, in other embodiments, that OS may also be updated in a similar fashion.

As shown, the multi-rooted hierarchy 100 may include possible libraries 120a-120d. For example, one or more libraries of libraries 120a-120d may be selected for a software stack level 140c. As illustrated, the multi-rooted hierarchy 100 may include possible services 125a-125d. For example, one or more services of services 125a-125d may be selected for a software stack level 140d. As shown, the multi-rooted hierarchy 100 may include possible applications (APPs) 130a-130d. For example, one or more APPs of APPs 130a-130d may be selected for a software stack level 140e.

As illustrated, a child node of the multi-rooted hierarchy 100 may point to one or more parent nodes of the multi-rooted hierarchy 100. For example, the parent nodes of the multi-rooted hierarchy 100 may be required such that one or more respective child nodes may function. In one or more implementations, the multi-rooted hierarchy 100 may include one or more properties of a graph. For example, service 125a may be a parent of application (APP) 130a and point to APP 130b. For instance, APP 130b may be at software stack level 140e and may be a plug-in for service 125a.

In one or more implementations, the multi-rooted hierarchy 100 may be stored via a data structure. For example, the data structure may be stored via a storage device (e.g., a volatile memory storage device, a non-volatile memory storage device, etc.). In one instance, the multi-rooted hierarchy 100 may be stored via a graph data structure. In another instance, the multi-rooted hierarchy 100 may be stored via a tree data structure.

Figure 2:
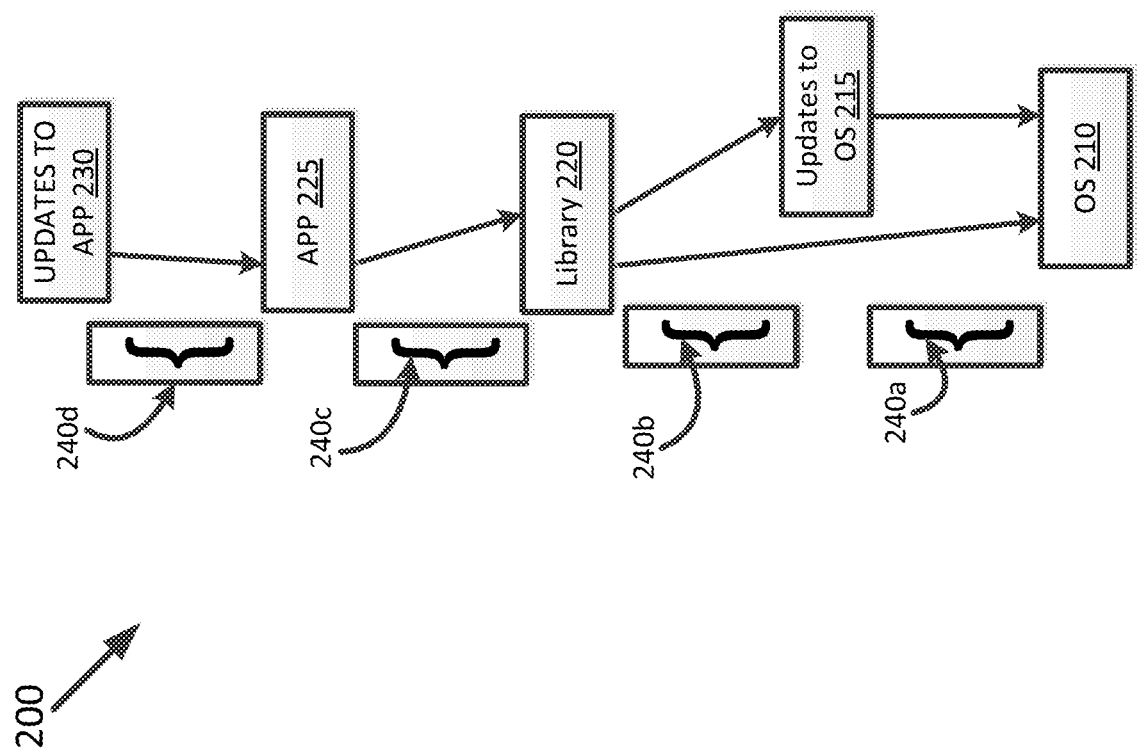
FIG. 2. is a block diagram of a container file system, in accordance with some implementations of the present disclosure.

FIG. 2 illustrates an example of a container file structure 200 in accordance with an illustrative implementation. The container file structure 200 includes five layers referred to as layers 0, 1, 2, 3, and 4 (not specifically marked in FIG. 2). Additional, fewer, or different layers may be included in container file structure 200 depending on the implementation. A base boot operation system (OS) 210 is provided at a base layer 0. The base boot OS 210, or "kernel," provides the essential software components for operation. Updates 215 to the OS 210 are at layer 1. The updates 215 can include additional software to enhance and improve the operation of the base boot OS 210 as well as fixes to errors. Libraries 220 are at layer 2. The libraries 220 contain data and files utilized by the base boot OS 210 and applications using the base boot OS 210. An application 225 is at a layer 3 and can include programs for carrying out instructions. Updates 230 to the application 225 are at a layer 4 and can include improvements and fixes to the application 225. The container file structure 200 is stored as a hierarchy of images in a database (not shown in FIG. 2).

Advantageously, the files in each layer of the container file structure 200 only need to contain delta images consisting of the result of a diff operation with the preceding layer. In other words, each layer only need contain what is different in the layer image from the image of the prior layer. Thus, the updates 215 in layer 1 only need to contain a difference 240a between the images of layer 0—the OS 210—and layer 1. Likewise, the library 220 only needs to contain a difference 240b between itself and the updates 215. The application 225 includes a difference 240c between itself and the library 220. The updates 230 include a difference 240d between itself and the application 225. Having layers that contain only differences in images rather than the entire image provides the advantage of a reduced needed size for each layer. Future updates to the container file structure 200 take place by adding leaf nodes to the hierarchy. That is, future updates are layered on top of the images at the highest current level.

Figure 3:
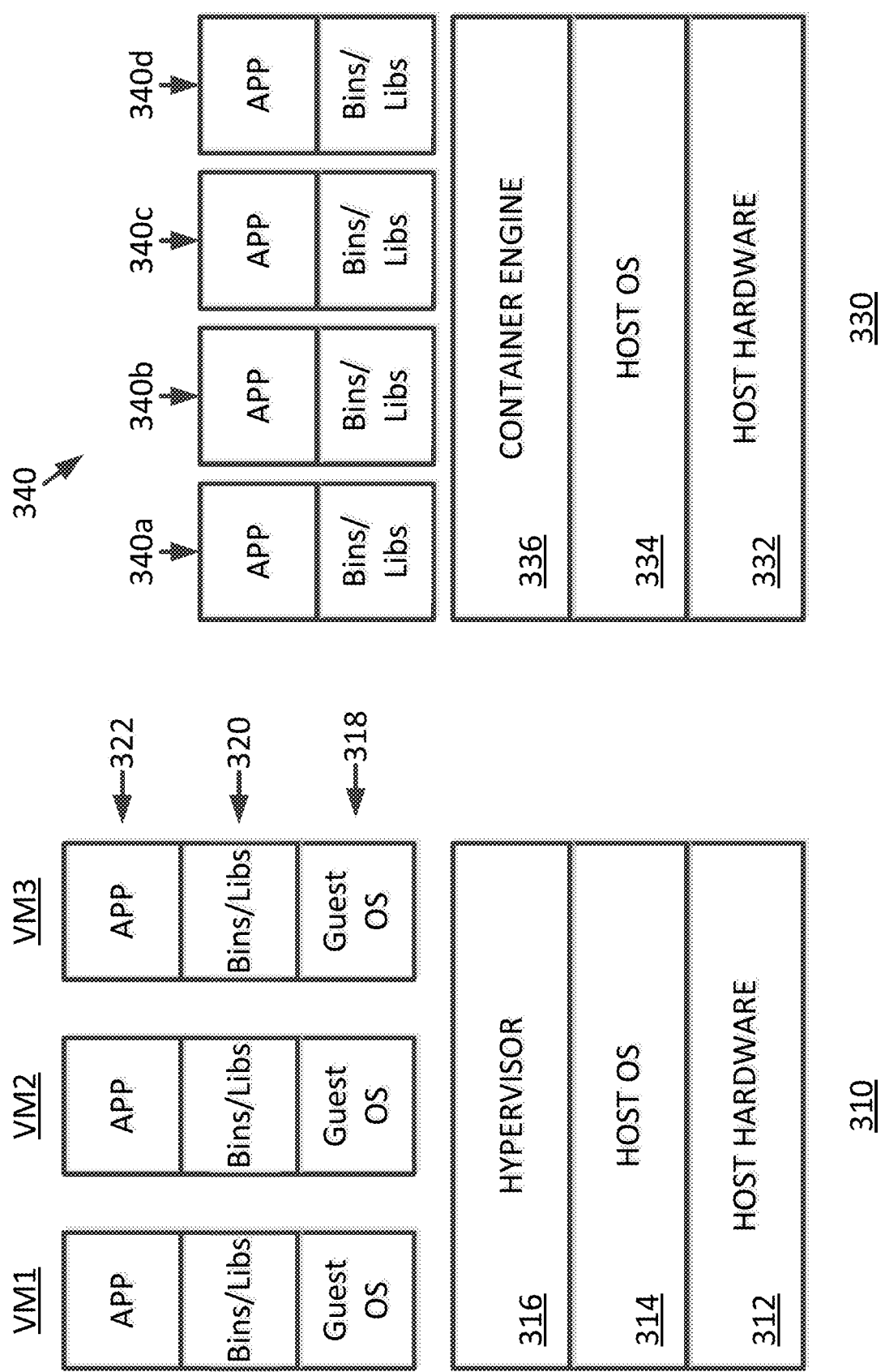
FIG. 3 is a block diagram illustrating a virtual machine (VM) system and a container machine system in accordance with some embodiments of the present disclosure.

FIG. 3 illustrates a VM system 310 and a container machine system 330. The present disclosure provides a system and method for creating virtual machines from a container using the hierarchy of containers. In an illustrative implementation, the VM system 310 includes a host hardware 312, a host OS or kernel 314, a hypervisor 316, and VMs such as VM1, VM2, and VM3. The hypervisor 316 interfaces with VMs including VM1, VM2, and VM3 to manage resources available from the host OS 314 and the host hardware 312. Each of the VMs can include guest OS 318, bins/libraries 320, and applications 322. Although only the host hardware 312, the host OS 314, the hypervisor 316, and the VMs have been shown in the VM system 310, in other embodiments, additional or other components may be provided within the VM system. For example, in other embodiments, a controller/service VM that is configured to manage input/output requests and otherwise manage the VM system 310 may also be provided. Likewise, although three of the VMs (e.g., the VM1, VM2, VM3) are shown in the VM system 310, in other embodiments, greater or fewer than three VMs may be provided within the VM system. Additionally, each of the VMs may include additional and/or other components than those shown herein. Furthermore, in some embodiments, multiple instances of the VM system 310 may be provided to form a cluster, and the various clusters may be controlled/managed by a central management system. Thus, the configuration of the VM system 310 may vary from one embodiment to another.

In comparison, the container system 330 includes host software 332, host OS 334, a container engine 336, and a plurality of containers 340, including containers 340a, 340b, 340c, and 340d. The container engine 336 interfaces with the plurality of containers 340, including the containers 340a, 340b, 340c, and 340d. Each of the plurality of containers 340 is a stand-alone executable package of software that includes all of the code, systems libraries, system tools, etc. that are needed to run that piece of software. By virtue of putting the software within a container, the software may be safely executed regardless of the underlying operating environment. In some embodiments, one or more of the plurality of containers 340 may be a Docker container from Docker Inc. For a Docker container, the container engine 336 may be Docker engine that is configured to manage Docker containers. In other embodiments, one or more of the plurality of containers 340 may be other types of containers and the container engine 336 may be of a type that is configured to manage those types of containers.

Further, each of the plurality of containers 340 may run on the same underlying machine and share the resources (e.g., the host hardware 332, the host OS 334, etc.) of that underlying machine while running their respective code in isolation. Thus, the software running on one of the plurality of containers 340 does not impact the software running on another one of the plurality of containers. Thus, each of the plurality of containers 340 includes applications as well as bins and libraries that form a container file system (e.g., the container file system 200 of FIG. 2). The container file system may be represented by a container image that includes all of the code, and other dependencies (e.g., system libraries, metadata, etc.) that are needed to properly execute the code. The container system 330 may, thus, include one or more images that are layered to appear as a single file system for that container.

It is to be understood that only some components of the container system 330 are shown herein. Nevertheless, other and/or additional components, such as CVM, etc. that may be needed or considered desirable to perform the functions described herein may be provided in other embodiments. Further, although only four of the plurality of containers 340 are shown herein, in other embodiments, greater or fewer than four containers may be provided. Likewise, the components of each of the plurality of containers 340 may vary from one embodiment to another. Thus, the container system 330 may be configured in a variety of ways depending upon the embodiment. Furthermore, in some embodiments, an underlying machine may include both virtual machines and containers thereon.

As indicated above, containers are suitable for development and test environments as they are light weight and can be started and stopped in a few milliseconds. However, since containers share the underlying machine's resources such as memory management, processor scheduling, file system and kernel, etc. containers are not suitable for production environments due to compromised security and isolation. In production environments, virtual machines are generally preferable. Accordingly, the present disclosure provides a mechanism to convert a container (e.g., a Docker container) into a virtual machine in an easy and simplified manner using the image files of that container. Specifically, and referring still to FIG. 3, after a developer generates the container system 330, an agent in a controller virtual machine (CVM) on the underlying machine (e.g., the machine on which the container being converted to a virtual machine is located) parses the container files of the container being converted using an administration tool. The CVM generates an ISO or virtual machine (VM) generation script which is used to build an ISO image file. Using the ISO image file, a VM image can then be created and booted, as explained in greater detail in FIG. 4 below.

Figure 4:
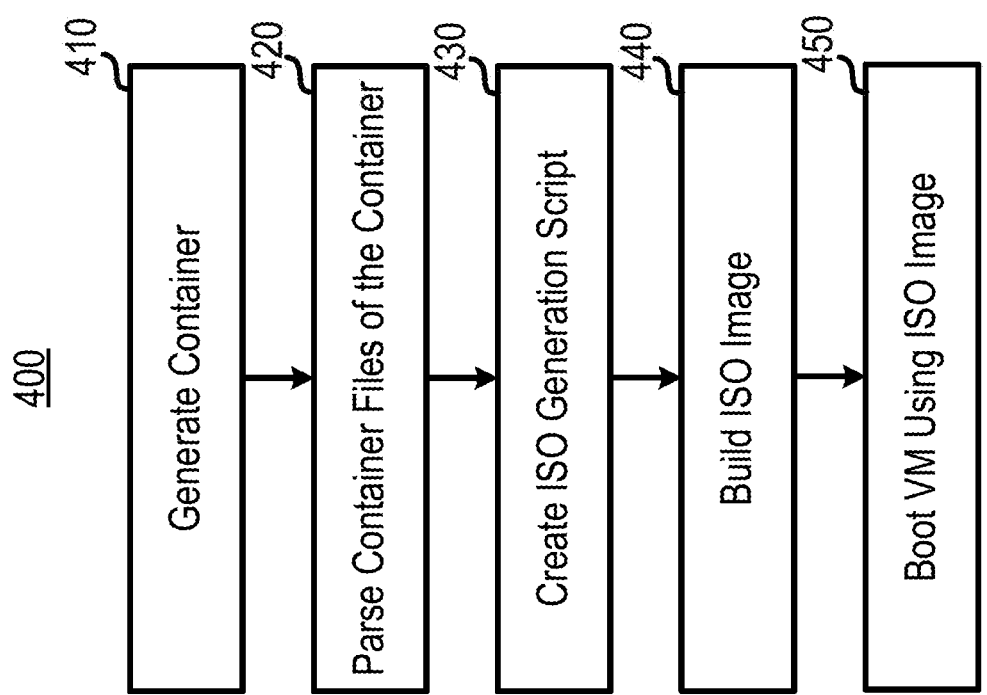
FIG. 4 is a flow diagram of a method for creating virtual machines from Docker containers in accordance with some embodiments of the present disclosure.

FIG. 4 illustrates a method 400 for creating virtual machines from containers (e.g., Docker containers) or otherwise converting a container (e.g., Docker container) into a virtual machine. Additional, fewer, or different operations may be performed in the method 400 depending on the implementation. In operation 410, a container (e.g., Docker container) is generated. In some embodiments, an existing container may be converted to a virtual machine. In such embodiments, the particular container that is to be converted to a virtual machine may be identified (e.g., using an identifier such as a name) by a user. The user may input the identity of the container to be converted into a virtual machine into the administrative tool of the CVM that implements the conversion of the container into the virtual machine. Upon identifying an existing container or generating a new container to be converted into a virtual machine, the CVM retrieves the container file(s) of the container being converted.

As indicated above, an example container (e.g., Docker container) includes a plurality of container files such as for bins, libraries, an application, etc. These filed may be configured in the form of a hierarchy. As also discussed with reference to FIGS. 2 and 3 above, a container file at any level of the container file hierarchy can contain a delta image reflecting changes in images from one level to the next. In an operation 420, the CVM parses the container files (e.g., Docker container files). An administration tool at the CVM can be used to take the container files and parse or separate them. By parsing the container files, the CVM is able to understand the setup environment of the application (e.g., what resources the application needs to properly run) within the container. Furthermore, depending upon the number of container files within the container, the CVM may parse a plurality of the container files. For example and particularly when the container files are arranged in a hierarchy, the CVM may receive (e.g., from a user) identification of a particular container file as an input. The CVM may use the input container file as a starting point for traversing through the hierarchy. In other embodiments, the CVM may be programmed to start with a default container file as the starting point.

Upon parsing a particular container file, the CVM identifies the parent container file of the parsed container file and parses the parent container file. Upon parsing the parent container file, the CVM identifies the parent container file of the parsed parent container file, and parses that container file as well. The CVM continues to parse files and climb up the hierarchy until the container file at the highest level of the hierarchy is reached and parsed. In some embodiments, the CVM may be configured to identify all of the container files in the hierarchy and parse all of the container files together.

Using the parsed files, in an operation 430, the CVM generates an ISO generation script, which then builds an ISO image in an operation 440. The ISO image can then be used to boot a VM in an operation 450. In some embodiments, for each parsed container file, the CVM may cache the ISO image of the virtual machine for use or reference later. The ISO image of the virtual machine provides a snapshot of all the data, code, and other information that is needed to properly run a particular application (e.g., on a virtual machine). Using the ISO images, the CVM may boot the virtual machine to run the same application that was previously running within the converted container to now run from a virtual machine. In some embodiments, the CVM may create "application virtual machines" that consist of multiple containers tied together based on a specification (e.g., Docker Compose). Thus, the present disclosure provides an easy and convenient end-to-end workflow of converting a container to a virtual machine.

To summarize, the process of converting a container (e.g., Docker container) into a virtual machine includes (1) receive a container file as an input and use the inherent hierarchy in the container file specification to read and parse the container file and get information regarding application environment setup; (2) find the parent of the current container file and parse the parent container file in the same manner as in Step (1); (3) repeat steps (1) and (2) until the base container file is reached; (4) at every level, while walking up the dependency chain in the hierarchy, cache the virtual machine image to avoid recreation when need to reuse arises later.

Figure 5:
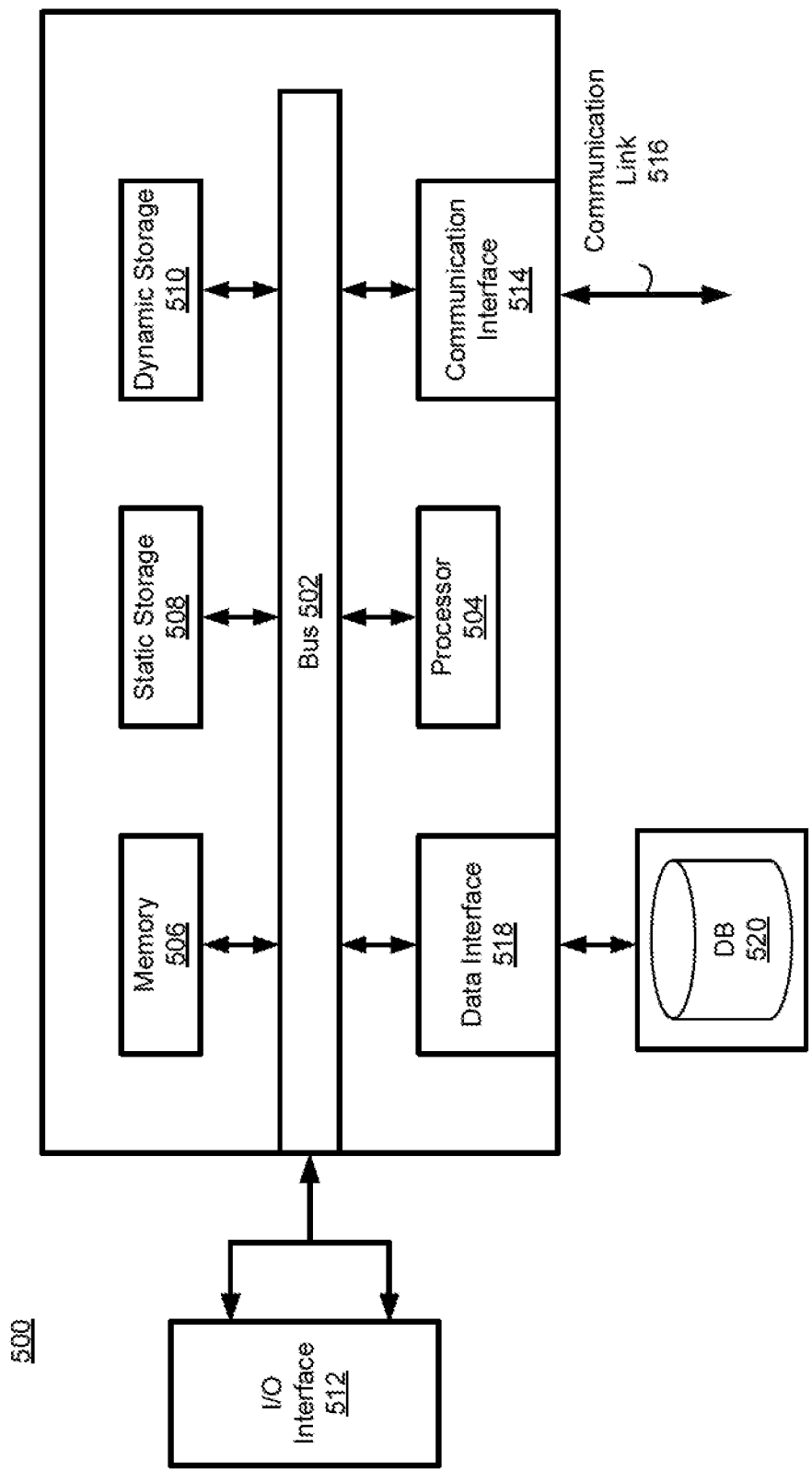
FIG. 5 is a block diagram of a computing system suitable for implementing particular embodiments disclosed herein.

Referring to FIG. 5, illustrated is a block diagram of an illustrative computing system 500 suitable for implementing particular embodiments for creating virtual machines from a container using the hierarchy of containers. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa. Moreover, reference to a computer system may encompass one or more computer systems.

This disclosure contemplates any suitable number of computer systems 500. Computer system 500 may include one or more computer systems 500; be unitary or distributed; span multiple locations; span multiple machines; span multiple data centers; or reside in a cloud, which may include one or more cloud components in one or more networks. One or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein.

In some embodiments, the computer system 500 includes a bus 502 (e.g., an address bus and a data bus) or other communication mechanism for communicating information, which interconnects subsystems and devices, such as processor 504, memory 506 (e.g., RAM), static storage 508 (e.g., ROM), dynamic storage 510 (e.g., magnetic or optical), communication interface 514 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 512 (e.g., keyboard, keypad, mouse, microphone). In particular embodiments, computer system 500 may include one or more of any such components.

In particular embodiments, processor 504 includes hardware for executing instructions, such as those making up a computer program. As an example and not by way of limitation, to execute instructions, processor 504 may retrieve (or fetch) the instructions from an internal register, an internal cache, memory 506, static storage 508, or dynamic storage 510; decode and execute them; and then write one or more results to an internal register, an internal cache, memory 506, static storage 508, or dynamic storage 510. In particular embodiments, processor 504 may include one or more internal caches for data, instructions, or addresses. This disclosure contemplates processor 504 including any suitable number of any suitable internal caches.

In particular embodiments, I/O interface 512 includes hardware, software, or both, providing one or more interfaces for communication between computer system 500 and one or more I/O devices. Computer system 500 may include one or more of these I/O devices. One or more of these I/O devices may enable communication between a person and computer system 500. In particular embodiments, communication interface 514 includes hardware, software, or both providing one or more interfaces for communication (such as, for example, packet-based communication) between computer system 500 and one or more other computer systems 500 or one or more networks.

One or more memory buses (which may each include an address bus and a data bus) may couple processor 504 to memory 506. Bus 502 may include one or more memory buses, as described below. In particular embodiments, one or more memory management units (MMUs) reside between processor 504 and memory 506 and facilitate accesses to memory 506 requested by processor 504. In particular embodiments, memory 506 includes random access memory (RAM). This RAM may be volatile memory, dynamic RAM (DRAM) or static RAM (SRAM). Moreover, this RAM may be single-ported or multi-ported RAM. This disclosure contemplates any suitable RAM. Memory 506 may include one or more memories 506. Although this disclosure describes and illustrates particular memory, this disclosure contemplates any suitable memory.

In some embodiments, computer system 500 performs specific operations by processor 504 executing one or more sequences of one or more instructions contained in memory 506. Such instructions may be read into memory 506 from another computer readable/usable medium, such as static storage 508 or dynamic storage 510. In alternative embodiments, hard-wired circuitry may be used in place of or in combination with software instructions to implement particular embodiments. Thus, particular embodiments are not limited to any specific combination of hardware circuitry and/or software. In particular embodiments, the term "logic" shall mean any combination of software or hardware that is used.

The term "computer readable medium" or "computer usable medium" as used herein refers to any medium that participates in providing instructions to processor 504 for execution. Such a medium may take many forms, including but not limited to, nonvolatile media and volatile media. Non-volatile media includes, for example, optical or magnetic disks, such as static storage 508 or dynamic storage 510. Volatile media includes dynamic memory, such as memory 506.

In particular embodiments, execution of the sequences of instructions may be performed by a single computer system 500; in alternative embodiments, two or more computer systems 500 coupled by communication link 516 (e.g., LAN, PTSN, or wireless network) may perform the sequence of instructions in coordination with one another.

Computer system 500 may transmit and receive messages, data, and instructions, including program, i.e., application code, through communication link 516 and communication interface 514. Received program code may be executed by processor 504 as it is received, and/or stored in static storage 508 or dynamic storage 510, or other non-volatile storage for later execution. A database 520 may be used to store data accessible by the system 500 by way of data interface 518.

Although the present disclosure has been described with respect to software applications, in other embodiments, one or more aspects of the present disclosure may be applicable to other components of a virtual computing system.

It is also to be understood that in some embodiments, any of the operations described herein may be implemented at least in part as computer-readable instructions stored on a computer-readable memory. Upon execution of the computer-readable instructions by a processor, the computer-readable instructions may cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
   receiving a container file as an input at a computer system, wherein the container file is part of a hierarchy of container files defined in a container file specification;
   parsing the container file to obtain information regarding resources needed for a container application in the container file;
   identifying a parent file of the container file in the hierarchy;
   parsing the parent file to obtain information regarding resources needed for a parent application in the parent file;
   repeating identifying and parsing at least one container file at each level in the hierarchy until a base of the hierarchy is reached; and
   caching a virtual machine image at each level in the hierarchy.

2. The method of claim 1, further comprising, generating the container file wherein the container file comprises at least an operating system, a library, and an application.

3. The method of claim 1, wherein each container file in the hierarchy comprises a delta image reflecting a change from one level to another level in the hierarchy.

4. The method of claim 3, wherein a second level of the hierarchy includes data indicating a difference from a first image associated with a first level and a second image associated with the second level.

5. The method of claim 3, wherein container files in the hierarchy include updates to the operating system and updates to the application of the container file.

6. The method of claim 1, further comprising booting a virtual machine using the cached virtual machine image.

7. The method of claim 6, wherein booting the virtual machine includes communicating with a hypervisor to engage a host operating system and host hardware.

8. An apparatus comprising:
a processor having programmed instructions to:
receive a container file as an input, wherein the container file is part of a hierarchy of container files defined in a container file specification;
parse the container file to obtain information regarding resources needed for a container application in the container file;
identify a parent file of the container file in the hierarchy;
parse the parent file to obtain information regarding resources needed for a parent application in the parent file;
repeat identifying and parsing at least one container file at each level in the hierarchy until a base of the hierarchy is reached; and
cache virtual machine image at each level in the hierarchy.

9. The apparatus of claim 8, wherein the processor further has programmed instructions to generate the container file, wherein the container file comprises at least an operating system and an application.

10. The apparatus of claim 9, wherein container files in the hierarchy include updates to the operating system and updates to the application of the container file.

11. The apparatus of claim 8, wherein each container file in the hierarchy comprises a delta image reflecting a change from one level to another level in the hierarchy.

12. The apparatus of claim 11, wherein a second level of the hierarchy includes data indicating a difference from a first image associated with a first level and a second image associated with the second level.

13. The apparatus of claim 8, wherein the processor further has programmed instructions to engage a container engine to access a resource available from a host operating system and host hardware.

14. The apparatus of claim 8, wherein the processor further has programmed instructions to boot a virtual machine using the cached virtual machine image.

15. The apparatus of claim 14, wherein booting the virtual machine includes communicating with a hypervisor to engage a host operating system and host hardware.

16. A non-transitory computer readable media with computer-executable instructions embodied thereon that, when executed by a processor of a computing system, cause the computing system to perform a process comprising:
receiving a container file as an input, wherein the container file is part of a hierarchy of container files defined in a container file specification;
parsing the container file to obtain information regarding resources needed for a container application in the container file;
identifying a parent file of the container file in the hierarchy;
parsing the parent file to obtain information regarding resources needed for a parent application in the parent file;
repeating identifying and parsing at least one container file at each level in the hierarchy until a base of the hierarchy is reached; and
caching a virtual machine image at each level in the hierarchy.

17. The non-transitory computer readable media of claim 16, further comprising generating the container file, wherein the container file comprises at least an operating system and an application.

18. The non-transitory computer readable media of claim 17, wherein container files in the hierarchy include updates to the operating system and updates to the application of the container file.

19. The non-transitory computer readable media of claim 16, wherein each container file in the hierarchy comprises a delta image reflecting a change from one level to another level in the hierarchy.

20. The non-transitory computer readable media of claim 19, wherein a second level of the hierarchy includes data indicating a difference from a first image associated with a first level and a second image associated with the second level.

21. The non-transitory computer readable media of claim 16, further comprising engaging a container engine to access a resource available from a host operating system and host hardware.

22. The non-transitory computer readable media of claim 16, further comprising booting a virtual machine using the cached virtual machine image.

23. The non-transitory computer readable media of claim 22, wherein booting the virtual machine includes communicating with a hypervisor to engage a host operating system and host hardware.

* * * * *